Patented Oct. 26, 1948

2,452,154

UNITED STATES PATENT OFFICE 2,452,154

BROMINATION

John Ross, Ramsey, N. J., assignor to Colgate-Palmolive-Peet Company, Jersey City, N. J., a corporation of Delaware No Drawing. Application April 15, 1942,
Serial No. 439,103

10 Claims. (Cl. 260—593)

The present invention relates to a novel process for preparing organic compounds and, more particularly, to a new method of brominating organic bodies.

Substitution of bromine in various organic compounds by direct reaction of the compound with molecular bromine has long been known. The prior art has employed various solvents for providing more intimate contact of reactants and for controlling the processes to minimize side reactions, but there have been concomitant disadvantages in their use which have greatly limited their value. Thus, some solvents tend to enter into the reaction, further complicating the desired process and making it difficult to obtain a pure product. Many of the solvents employed are inflammable and/or noxious, and some of them are corrosive. Another common objection is the difficulty of removing the solvents from the product after completion of the reaction, and, in some cases, while the liquid used may be a solvent for one of the reactants, it may dissolve the other with difficulty, if at all.

For example, although earlier investigators were unable, because of the activity of the hydroxyl group, to prepare parabromophenol commercially by direct bromination of phenol, tribromophenol being produced instead, the art has more recently accomplished this result by employing carbon bisulphide as a solvent for the phenol and the bromine and by using a freezing mixture of ice and salt. However, carbon bisulphide is in many respects an undesirable solvent, especially for industrial use, as it is highly inflammable and noxious, and the necessity for using a freezing mixture is also a disadvantage.

It is an object of the present invention to provide a novel process for rapidly brominating organic compounds to obtain good yields of bromine-substituted products of high purity.

It is another object of the invention to provide a new method for substituting bromine in organic bodies in an inert, low-boiling, non-inflammable solvent.

Other objects and advantages of the invention will be apparent from the following description.

According to the present invention, bromine is contacted with an organic compound to be brominated in an inert, non-aqueous, polar medium, such as liquid sulphur dioxide, for a relatively short time. After substitution of bromine in the molecule, the liquid sulphur dioxide is removed, and the bromine-containing product is recovered.

The process of the invention is applicable for the substitution of bromine in organic compounds, particularly for hydrogen atoms in the molecule, and the process is especially applicable to the bromination of organic compounds of the aromatic type, although certain aliphatic compounds can also be bromine-substituted by this method. The compounds which may be thus reacted include aromatic hydrocarbons, acids, alcohols, ketones, amines and the like, as well as derivatives of these compounds, including sulphonated, nitrated, halogenated, or aliphatic-substituted bodies, etc., and the like. Compounds satisfactory for bromination by this method include benzene, toluene, phenol, aniline, acetophenone, benzoic acid, etc. The process of this invention is thus applicable for direct bromination of any organic compound capable of substituting bromine at similar temperatures and is particularly advantageous for nuclear bromination of organic aromatic compounds.

It is sometimes of advantage to employ a catalyst in the bromination reaction. It has been found, especially where an aliphatic group is attached to an aromatic nucleus, that the presence of a carrier influences the bromine to substitute in the nucleus rather than in the aliphatic chain, especially under relatively low temperatures. Among the catalysts which have been satisfactorily used are included anhydrous aluminum chloride, anhydrous aluminum bromide, ferric bromide, iron filings, iodine and pyridine. In general, where polybromination is not desired, the use of aluminum halide catalysts may be avoided in favor of other, less active, catalysts, such as ferric bromide or iron filings.

A convenient way of contacting organic compounds with bromine is to dissolve the organic compound in liquid sulphur dioxide and then to add bromine dropwise to the solution while agitating. If desired, the bromine may be dissolved in liquid sulphur dioxide and/or in an organic solvent before addition to the liquid sulphur dioxide solution of the organic compound. Bromine is very readily soluble in liquid sulphur dioxide, and contact with organic compounds may also be effected therein by first dissolving the bromine in liquid sulphur dioxide and then running the organic compound, if liquid, into the sulphur dioxide solution of bromine while agitating. If the organic compound is gaseous, it may be bubbled through the sulphur dioxide solution of bromine. The organic compound, if solid, may be added directly to the liquid sulphur dioxide solution of bromine and may be dissolved or suspended therein, or it may be liquefied prior to admixture by the use of heat and/or of solvents. However, it will be understood from the foregoing that the mixture may also be made by running the sulphur dioxide solution of bromine into the organic compound wherein bromine is to be substituted, or the two bodies may be admixed in concurrent streams or may be passed in countercurrent to each other in continuous operation. Such countercurrent contact is of particular convenience where the organic compound is gaseous and can be bubbled upward through a downwardly moving column of the sulphur dioxide solution of bromine.

The organic reactants may advantageously be dissolved in another inert solvent for admixture with the sulphur dioxide solution of bromine, especially where the reactant is insoluble or only slightly soluble in liquid sulphur dioxide. The reaction mixture may thus be of either one or two liquid phases, and it is preferred that the solvent selected be at least partly miscible with liquid sulphur dioxide. Suitable solvents or suspending media for the organic reactant include butane, pentane, hexane, decane and other alkanes; carbon tetrachloride, chloroform, ethylene dichloride, ethyl bromide, dichloro-difluoro methane, and other halogenated hydrocarbons; cyclohexane, decalin, tetralin, and other cycloaliphatics; acetic acid; petroleum ether and gasoline, and the like, and any mixtures thereof with each other and/or with liquid sulphur dioxide.

The contact in liquid sulphur dioxide of the organic reactant and the bromine is preferably aided by agitation, especially where more than one phase is present. The time of contact varies appreciably, depending upon the compound to be reacted, but it has been observed that high yields are obtainable with most reactants after about fifteen to about thirty minutes, and in some cases in even shorter time. Similarly, the proportions of the organic reactant to the bromine may vary widely, especially for different degrees of bromine-substitution. The reaction temperatures and pressures may also be varied within wide limits, again depending upon the compound to be reacted and the product to be formed. In general, it is preferred to carry out the reaction at temperatures around −10° C. or below and at atmospheric pressure, although temperatures from about −40° to about 70° C. or even higher, but below the critical temperature of sulphur dioxide, may be used. Likewise, either superatmospheric or reduced pressures may also be employed, the former being preferred at higher temperatures in order to keep the sulphur dioxide in the liquid state. When the operation is carried out at temperatures and pressures and/or under conditions which remove substantial amounts of the sulphur dioxide through volatilization or otherwise, it is desirable to provide for the addition of sufficient liquid sulphur dioxide to the reaction mixture in order that the volume may be appropriately adjusted. In this manner, by regulation of the pressure, control of temperatures can be obtained.

After the reaction has progressed to the desired degree, the sulphur dioxide is removed from the reaction mixture. This may be accomplished by bubbling an inert gas, such as carbon dioxide, nitrogen, stack gases, etc., through the mixture, and/or by gradually pouring the mixture into ice water or upon ice, during which operation most of the liquid sulphur dioxide volatilizes, and/or by other means. Suitable equipment may be provided for carrying out these operations, whereby the volatility of the sulphur dioxide may be increased, as by reducing the pressure in the system. Such equipment may also be provided with condensers, whereby excess bromine, the volatilized sulphur dioxide and/or other solvents employed may be recovered for reuse. In many cases, the nature of the product formed is such that its temperature may be increased without deleterious effect, so that most or all of the remaining solvent and/or excess bromine may be removed from the reaction mixture by heating or the like. Known methods, including fractional distillation, fractional crystallization, extraction, and other separation procedures or any combination of these, may be employed for separating the product from the aqueous mass and/or from unreacted materials.

The following examples are provided to illustrate the present invention, and it will be apparent that the invention is not limited thereto.

*Example I*

About 100 cc. of liquid sulphur dioxide is tapped from an inverted cylinder of sulphur dioxide into a cylindrical, unsilvered Dewar flask of about 1 liter capacity, open at the top, and provided with an electric stirrer. About 9.4 grams of phenol are dissolved in the liquid sulphur dioxide, and about 16 grams of bromine are added dropwise during a period of at least fifteen minutes. The mixture is continuously stirred during the addition of the bromine, and the resulting reaction is apparently instantaneous, the temperature being maintained at about −8° C. Agitation by means of the stirrer is continued for about fifteen minutes longer, and the reaction mixture is then transferred to a beaker, where the sulphur dioxide and considerable hydrogen bromide formed in the reaction are volatilized. A crude, oily residue remains in the beaker and is thereafter distilled in vacuo. About 15.8 grams of material having a boiling point of about 105° to about 110° C. at a pressure of 3 mm. of mercury is obtained, and this material crystallizes at about 65° C. It is therefore indicated that the material obtained is para-bromophenol, and this represents a yield of about 91.5%.

*Example II*

A solution of about 80 grams of bromine in about 1000 cc. of sulphur dioxide is prepared, and about 30 grams of acetone are slowly added to this solution, employing a mechanical stirrer for continuous agitation during the addition. The stirring is continued until the reaction is completed, as indicated by disappearance of the bromine, and the reaction mixture is then slowly poured into a beaker to evaporate the sulphur dioxide. The product is extracted with petroleum ether, dried and distilled and comprises bromoacetone.

*Example III*

About 60 grams of acetophenone are dissolved in about 1000 cc. of sulphur dioxide, and about 80 grams of bromine are then added to this solution. The addition of the bromine is made slowly and with continuous agitation, and the agitation is continued until the reaction is completed. The mixture is then poured into a beaker to volatilize sulphur dioxide and hydrogen bromide, and the residue is distilled to produce a high yield of phenacyl bromide.

The use of liquid sulphur dioxide as a solvent medium for the reactants has many advantages in forming bromine-substitution products. Liquid sulphur dioxide is inexpensive, easily removable, non-corrosive and non-inflammable and has a low boiling point. Its use is of particular advantage in those cases where secondary reactions, including polybrominations or bromination of an aliphatic side chain instead of or along with an aliphatic nucleus, may take place at higher temperatures and are to be avoided. Close control of reaction temperatures, ordinarily unattainable or attainable only with great difficulty, can be easily maintained in liquid sulphur dioxide, especially with regulation of pressure.

Although the present invention has been described with reference to particular embodiments and examples, it will be apparent to those skilled in the art that variations and modifications of this invention can be made and that equivalents can be substituted therefor without departing from the principles and true spirit of the invention. Such variations and modifications are believed to be within the scope of the present specification and within the purview of the appended claims.

I claim:

1. The process of brominating organic compounds which comprises reacting bromine with an organic compound in liquid sulphur dioxide.

2. The process of brominating organic compounds which comprises mixing bromine with an organic compound capable of being brominated by substitution of bromine therein while at least one of said bromine and said organic compound is dissolved in liquid sulphur dioxide, and removing sulphur dioxide from said mixture.

3. The process of brominating organic compounds which comprises dissolving in liquid sulphur dioxide an organic compound having an aromatic group capable of being brominated by substitution of bromine therein, slowly adding bromine to said liquid sulphur dioxide solution while agitating, and then removing sulphur dioxide therefrom.

4. In a process of substituting bromine in an organic compound, the improvement which comprises intimately contacting said organic compound with bromine while at least one of said organic compound and said bromine is dissolved in liquid sulphur dioxide.

5. In a process of substituting bromine in an organic compound having an aromatic group, the improvement which comprises preparing a solution of the organic compound in liquid sulphur dioxide, mixing bromine with said solution, removing sulphur dioxide from said mixture to leave a residue, and recovering the substitution product from said residue.

6. In the process of substituting bromine in an organic compound having an aromatic group, the improvement which comprises preparing a solution of bromine in liquid sulphur dioxide, mixing said solution with said organic compound, removing sulphur dioxide from said mixture to leave a residue, and recovering the substitution product from said residue.

7. In a process of substituting bromine in an organic compound having an aromatic group, the improvement which comprises preparing a solution of bromine in liquid sulphur dioxide as a solvent, dissolving said organic compound in a substantially inert solvent at least partially miscible with liquid sulphur dioxide to form a second solution, intimately mixing said solutions, removing said solvents comprising sulphur dioxide from said mixture to leave a residue, and recovering the substitution product from said residue.

8. A process of producing para-bromophenol which comprises intimately contacting phenol with bromine while at least one of said reactants is dissolved in liquid sulphur dioxide.

9. A process of producing para-bromophenol which comprises dissolving phenol in liquid sulphur dioxide to form a solution, slowly adding bromine to said solution while thoroughly mixing, removing sulphur dioxide from said mixture to leave a residue, and recovering para-bromophenol from said residue.

10. A process of producing bromoacetone which comprises intimately mixing acetone with bromine while at least one of said reactants is dissolved in liquid sulphur dioxide.

JOHN ROSS.

REFERENCES CITED

The following references are of record in the file of this patent:

UNITED STATES PATENTS

| Number | Name | Date |
|---|---|---|
| 554,974 | Baum | Feb. 18, 1896 |
| 631,608 | Bally | Aug. 22, 1899 |
| 1,440,976 | Ellis et al. | Jan. 2, 1923 |
| 1,760,328 | Twiss | May 27, 1930 |
| 1,847,566 | Laschinger | Mar. 1, 1932 |
| 1,933,987 | Laska | Nov. 7, 1933 |
| 2,013,791 | Sachs | Sept. 10, 1935 |
| 2,046,090 | Reed | June 30, 1936 |
| 2,224,155 | Kennedy | Dec. 10, 1940 |
| 2,244,512 | Brandt | June 3, 1941 |

FOREIGN PATENTS

| Number | Country | Date |
|---|---|---|
| 298,944 | Germany | Dec. 13, 1919 |

OTHER REFERENCES

"Chemical Abstracts," vol. 17, page 748 (1923), abstract of article by Meerwein et al.

Ibid, vol. 29, col. 2465 (1935), abstract of article by Cornog et al. in "Proc. Iowa Acad. Sci.," vol. 40, pages 97–8 (1933).

Smyth, "Dielectric Constant and Molecular Structure," (A. C. S. Monogrgaph No. 55, pages 191–3. (Copy in Div. 64.)